Patented May 11, 1943

2,318,625

UNITED STATES PATENT OFFICE 2,318,625

PRODUCTION OF LUBRICATING OILS

Mathias Pier, Heidelberg, and Friedrich Christmann, Ludwigshafen-on-the-Rhine, Germany; vested in the Alien Property Custodian No Drawing. Application October 6, 1937, Serial No. 167,554

5 Claims. (Cl. 196—78)

The present invention relates to improvements in the production of lubricating oils and other valuable products.

We have found that good lubricating oils having an average molecular weight up to 500 or even considerably above this, especially products rich in hydrogen containing hydrogen and carbon in a ratio of more than 13.5 parts of hydrogen to each 100 parts of carbon, and other valuable products are obtained, if hydrocarbons of high molecular weight, rich in hydrogen and having no or only slight lubricating properties, or derivatives of such hydrocarbons are subjected to chemical condensation.

The initial materials to be used according to the present invention should contain at least from 13.5 to 15 parts of hydrogen for each 100 parts of carbon, and they should contain the more hydrogen, the lower their molecular weight. They should have a mean molecular weight of at least 170, and with that mean molecular weight they should contain at least 15 parts of hydrogen for each 100 parts of carbon; when they have a mean molecular weight greater than 250, for example greater than 280, the hydrogen content may be as low as 13.5 parts of hydrogen for each 100 parts of carbon, although in this case also the hydrogen content should preferably be higher.

It results from the foregoing definition that the initial materials used in accordance with the present invention should have a mean molecular weight at least as high as that of middle oils. As examples of the said initial materials may be mentioned saturated or unsaturated, liquid, semi-solid or solid paraffinic hydrocarbons of high molecular weight, for example greater than 250, and rich in hydrogen, which mainly boil above 250° C. and preferably above 300° C., from any origin as for example from natural sources, or prepared by low temperature carbonization of brown coal or shales or by the destructive hydrogenation of coals, tars, mineral oils and the like, or synthetically prepared products as for example those which have been prepared by the reduction of the oxides of carbon with or without the aid of elevated pressure or by the condensation of the constituents of gases from cracking or low temperature carbonization processes or mixtures of the said initial materials. Moreover, hydrocarbons of high molecular weight containing a ring system in their molecule, as for example naphthenic hydrocarbons or substances of high molecular weight prepared by the treatment of hydrocarbons of low molecular weight with high-frequency electric currents, may also serve as the initial materials. Hydrocarbons of high molecular weight, obtained by condensation or polymerization of other hydrocarbons, may also be employed as the initial materials; thus the process may be carried out with the products of high molecular weight obtained by polymerizating unsaturated hydrocarbons, such as olefines, having a low molecular weight. As further initial materials may be mentioned petroleum jelly, ceresine, ozokerite, or montan wax. Use may also be made as initial materials of aliphatic middle oils rich in hydrogen, such as illuminating oils. These may be obtained by distillation from mineral oils and the like or by the destructive hydrogenation of coals, tars, mineral oils and oil shales or by pressure extraction of suitable carbonaceous materials, such as brown coal. Initial materials suitable for use according to the present invention are also obtained by starting from hydrocarbons or derivatives thereof which have a mean molecular weight as hereinbefore defined, but which are too poor in hydrogen, and subjecting these materials to a hydrogenation, preferably under increased pressure and with the aid of catalysts, whereby the hydrogen content is brought within the limit specified. Such previous hydrogenation may also be advantageous in the case of initial materials which correspond to the above definition, but which are still capable of being hydrogenated.

Initial materials which contain less hydrogen than indicated above, may also be mixed with initial materials very rich in hydrogen, whereby mixtures are obtained which correspond to the above definition. Initial materials suitable for use according to the present invention may also be obtained from mixtures containing them by treatment with suitable solvents such as liquid sulphur dioxide, phenols and the like, in order to split them up into constituents poor in hydrogen and those rich in hydrogen, the latter being employed according to the present invention, if necessary after they have been rendered still richer in hydrogen by a further hydrogenation, while the constituents poor in hydrogen may be worked up in any suitable manner, as for example subjected to a destructive hydrogenation in order to obtain products richer in hydrogen.

It results from the foregoing that the initial materials may either have an open chain structure, or may be of cyclic nature. Preferably, however, initial materials with an open chain structure are employed, because these, as a rule, give the most valuable products due to their particularly high content in hydrogen. As has been pointed out above, the process according to the present invention comprises subjecting the initial materials to chemical condensation. This chemical condensation may be effected with or without splitting off atoms or small radicles or molecules, either by combining hydrocarbons of different character with each other or by combining hydrocarbons of a similar or of the same character, which latter kind of combination or chemical condensation is generally known as polymerization.

For the purpose of effecting the chemical condensation, the initial materials are first exposed to the action of agents capable of introducing exchangeable substituents and are then subjected to the action of chemical condensing agents. By "exchangeable substituents" we wish to include oxygen, sulphur and the halogens, as for example chlorine or bromine. For the introduction of such substituents, the initial materials may be treated, for example, with halogenating agents such as the free halogens or halogen compounds capable of exchanging halogen. The action of the halogen or the halogen-exchanging halogen compounds is preferably effected in the presence of catalysts, such as iodine, antimony trichloride and the like. It is often advisable to carry out this treatment in the presence of inert diluents, as for example carbon tetrachloride. The temperatures used will as a rule range between room temperature and about 100° C. Instead of halogen or halogen-exchanging halogen compounds, for example oxygen may be introduced by passing the initial material with a gas containing oxygen, such as air, at an elevated temperature, for example between about 200° and 400° C., over catalysts such as bauxite or clay sherds. The oxidation may also be effected by passing air through the fused initial material, for example in the presence of aluminium fillers. Sulphur may be introduced into the initial materials by treatment with elementary sulphur or with sulphur compounds, for example sulphuric acid or sulphur trioxide or similar agents having an additive or substituting action. In some cases the process may be carried out so that the halogen, oxygen or the like does not enter the hydrocarbon as a substituent capable of being split off again but acts directly as an agent for withdrawing hydrogen from the molecules of the initial material.

The materials thus treated with agents capable of introducing exchangeable substituents are then subjected to a treatment with chemical condensing agents such as anhydrous inorganic halides having a condensing action, for example aluminium chloride, zinc chloride, iron chloride, boron fluoride, tin chloride, phosphorus oxychloride, antimony chloride, or metals, such as activated aluminium, sodium, alkaline earth metals, zinc dust or alloys containing such metals. The condensation with the aid of said halides may be carried out at ordinary or elevated temperatures, those up to 100° C. usually being employed, and preferably those between 30° and 70° C. In cases where metals are employed as the chemical condensing agent, temperatures of between 100° and 200° C. have been found to be very suitable. Inorganic oxides having an acid reaction, or salts thereof, and in particular oxides capable of forming complex compounds as for example phosphorus pentoxide, molybdenum trioxide, tungstic oxide or chromic oxide are also very suitable condensing agents and these are preferably employed at temperatures between 100° and 200° C. The chemical condensation may be effected at any suitable pressure, but preferably at atmospheric or increased pressures, as for example 10, 50, 100, 200, 1000 atmospheres or more. The aforesaid chemical condensing agents are particularly valuable when the initial materials have been treated with halogenating agents. When sulphur or oxygen are used as the exchangeable substituents, the chemical condensation is preferably carried out in the presence of phosphorus pentoxide or alkalies or agents having a similar action. These agents are preferably used at temperatures between about 20° and 150° C. The chemical condensation may also be effected by means of fuming sulphuric acid, in which case cooling is necessary. If desired, additions may be made of suspending or emulsifying agents, as for example dilute aqueous solutions of ammonia or aqueous solutions of wetting agents.

During the aforesaid chemical condensation, the exchangeable constituents are, as a rule, split off as such or in the form of their compounds, such as hydrogen halide, water or carbon dioxide, and simultaneously the molecules and radicals of the initial materials formed thereby combine with each other with the formation of lubricating oils or other valuable products. This chemical condensation proceeds in a still more satisfactory way when it is carried out in two stages, in the first of which the exchangeable substituents are split off as such or in the form of their compounds such as halogen hydride, at temperatures below or above the cracking temperature of the products to be treated, the resulting dehydrogenated products being then chemically condensed or polymerized. The said removal of the halogen or halogen compounds may be carried out for example in the presence of alumina, bauxite, aluminium chloride, zinc chloride, barium chloride and the like. Temperatures between 250° and 400° C. are preferably employed for this treatment. The resulting products are then subjected to the action of the aforesaid chemical condensing agents.

It will be seen from the foregoing that during the chemical condensation, hydrogen is sometimes split off from the initial materials, for example in the form of hydrogen halide. In these cases care must be taken that the initial material is correspondingly richer in hydrogen as compared with the foregoing definition of the hydrogen content of the initial materials.

It is preferable to carry out the chemical condensation, whether it be effected in one or in two stages, under so vigorous conditions, for example as regards the temperature or activity of the condensing agent employed, that the exchangeable substituents are completely or practically completely eliminated; thereby particularly useful products are obtained.

It is often advantageous to carry out the chemical condensation in the presence of inert gases, such as nitrogen or carbon dioxide, or of olefines, or diolefines, or mixtures of these, such as ethylene, propylene, butylene, butadiene or isoprene, or gases obtained by cracking. Thus, the said olefines may be passed into the materials undergoing chemical condensation. Particularly valuable products are obtained when carrying out the chemical condensation in the presence of cyclic hydrocarbons, i. e. aromatic or hydroaromatic hydrocarbons, and these may be employed instead of or in addition to the aforesaid olefines.

Suitable cyclic hydrocarbons are especially naphthalene or mineral coal tar fractions such as crude benzol, middle oils, anthracene oils as well as aromatic oils obtained for example by destructive hydrogenation, aromatization, dehydrogenation and the like, or tetrahydronaphthalene, naphthenes, cyclohexane and the like. Also other liquid hydrocarbons such as tars, mineral oils or products obtained therefrom by distillation, extraction or cracking, or products from the destructive hydrogenation of carbonaceous materials, or liquid olefines obtained for example by cracking paraffinic hydrocarbons may be employed for the said purpose.

The nature of the products obtained according to the present invention varies to some extent with the nature of the initial materials employed and with the specific conditions under which the chemical condensation is carried out. Depending on the particular conditions of each case, either valuable lubricating oils or solid products of still higher molecular weight, which are difficultly fusible or infusible, or mixtures of these two types of products are thus obtained. The formation of the said solid products, which are probably in most cases high-molecular hydrocarbons, is favored by carrying out the chemical condensation under very strong conditions of working and also by employing initial materials which are of particularly high molecular weight and which contain appreciable amounts of hydrocarbons which are unsaturated twice or more than twice. Therefore, when it is desired to prepare lubricating oils practically exclusively, it is often desirable to carry out the chemical condensation with an addition of substances which retard the action of the chemical condensing agents. For this purpose use may be made for example of zinc oxide, soda, calcium carbonate or ammonia.

A more reliable control of the reaction for effecting practically exclusively the production of lubricating oils is, however, obtained by carrying out the chemical condensation in a liquid inert diluent. For example, ether, acetone, or completely saturated benzines or kerosenes may be employed as reaction media.

The solid products obtained according to the present invention may be employed for example as insulating materials or in admixture with insulating substances or may be worked up by a suitable mechanical treatment, as for example rolling and kneading, into elastic products similar to rubber, and if desired may be mixed with rubber or rubber-like products.

The lubricating oils obtained according to the present invention, which contain more than 13.5 parts of hydrogen for each 100 parts of carbon meet almost any requirements of practice when properly selected for the particular use in respect of their viscosity, lubricating power, flash point, behavior in the cold test and other important properties. When products which are too poor in hydrogen are obtained as by-products, these may be further improved by hydrogenation, for example at temperatures between 400° and 450° C. under high pressures of 100, or more suitably 200, 500, 1000 or even more atmospheres and with the aid of strongly hydrogenating catalysts. Or such products may be improved by again subjecting them to the process in accordance with the present invention, and such treatment may also be combined with the aforesaid hydrogenation. Hydrogenation sometimes also still further improves those products which correspond to the hydrogen content hereinbefore specified.

The lubricating oils obtained according to the present invention may often be still further improved by subjecting them to steam distillation in the presence of bleaching earths, such as Florida earth. Similar results are also obtained by adding bleaching earths to the chemical condensing agents with which the chemical condensation is carried out.

Many of the lubricating oils obtainable according to the present invention possess valuable properties by which they are distinguished from the lubricants which have been known prior to the present invention. Thus, products may be obtained which have a mean molecular weight above 1000 up to about 2000, a viscosity at 100° C. of from about 10° to about 100° Engler, and a viscosity index (see Dean and Davis, Chemical & Metallurgical Engineering, vol. 36 (1929), page 618) between about 125 and about 140 and often between about 135 and about 140. Other products, in particular those obtainable by carrying out the condensation in the presence of cyclic hydrocarbons such as naphthalene, are characterized by having a mean molecular weight between about 700 and about 1000, a viscosity at 100° C. of from about 8° to about 30° Engler, and a viscosity index between about 115 and about 120.

The valuable lubricating oils obtained according to the present invention are also of very great practical importance for improving less valuable lubricating oils. Thus for example a motor oil of good quality may be prepared by mixing 1 part of a valuable lubricating oil prepared according to the present invention with 2 parts of a commercial machine oil.

Valuable mixtures are obtained by mixing lubricating oils, prepared according to the present invention, which contain more than 13.5 parts of hydrogen to each 100 parts of carbon, with other oils the hydrogen content of which lies below this limit and/or which have an unsatisfactory viscosity-temperature curve. As initial constituents of the latter kinds may be mentioned for example viscous oils, such as are sometimes obtained from mineral oil or tar products or from products of the extraction, destructive hydrogenation or liquefaction of coals, oil shales or the like; furthermore, products, the hydrogen content of which lies below the said limit, which are obtainable from hydrocarbons or hydrocarbon derivatives and which by treatment with halogen and if necessary by subsequent chemical condensation with unsaturated hydrocarbons, either alone or with tar oils or mineral oils, are converted into products of high molecular weight, are also suitable. These viscous oils, the hydrogen content of which is up to 13.5 parts to each 100 parts of carbon, sometimes have the drawback that they have a temperature-viscosity curve which is inferior to that of the commercial lubricating oils. By the appropriate addition of a synthetic lubricating oil, rich in hydrogen, oils may be prepared, the temperature-viscosity curve of which corresponds to that of the usual lubricating oils, although the hydrogen content of these mixed oils may lie below 13.5 parts to each 100 parts of carbon. By an addition of small amounts of this product, the behavior of other oils in the cold test can be considerably improved. In addition to a far-reaching utilization of the crude material the great advantage of the process according to the present invention lies in the fact that cylinder or motor oils may be prepared which are equally as valuable as, and in part even superior to, the Pennsylvanian oils.

The following examples will further illustrate the nature of this invention, but the invention is not restricted to these examples. The parts are by weight.

Example 1

Chlorine is led, while stirring, into brown coal paraffin wax, having a melting point of 52° C., at a temperature of from 100° to 150° C. until the increase in weight amounts to about 12 per cent of the paraffin employed. The chlorination may be promoted by exposure to light or by the presence of a catalyst, as for example iodine. 100 parts of this chlorinated paraffin are chemically condensed at from 30° to 50° C. with 10 parts of naphthalene in the presence of 10 parts of aluminium chloride, and a saturated kerosene as a diluent. After cooling, two layers are obtained. The upper layer contains the kerosene, unchanged paraffin and the condensation product. By distilling off the kerosene, removing the paraffin by freezing out and distilling off the constituents which boil up to 220° C. at a pressure of 15 millimeters mercury gauge, a motor oil having a viscosity of 10° Engler at 50° C., a mean molecular weight of 550 and a hydrogen content of about 15 parts to each 100 parts of carbon is obtained from the upper layer. The yield of motor oil amounts to about 50 parts.

The lower layer contains, in addition to aluminium chloride and unchanged paraffin, a resin oil which may be isolated in the usual manner and may be converted into a good lubricating oil by hydrogenation and if necessary by subsequent chemical condensation as hereinbefore described.

The motor oil may be split up into spindle oil and cylinder oil by careful distillation, and in this manner a hot steam cylinder oil having a specific gravity of 0.909 and a flashpoint of 330° C., and a mean molecular weight of from 800 to 900 may be obtained in an amount of 50 per cent of the motor oil.

Small traces of chlorine which may be present in the product, may be removed by stirring with 2 to 4 per cent of sodium at between 150° and 200° C.

By mixing 30 parts of a cylinder oil having a viscosity of 5° Engler at 100° C. prepared as hereinbefore described with 70 parts of a light machine oil having a viscosity of 4° Engler at 50° C., a good motor oil having a viscosity of 10° Engler at 50° C. is obtained.

Example 2

30 parts of a cylinder oil containing 14.3 parts of hydrogen to each 100 parts of carbon prepared according to the present invention are mixed with 70 parts of a light machine oil having a hydrogen content of 12.7 parts to each 100 parts of carbon, prepared by destructive hydrogenation of brown coal low temperature carbonization tar. A motor oil is obtained the temperature-viscosity curve of which corresponds to that of a Pennsylvanian oil and which contains 13.1 parts of hydrogen to each 100 parts of carbon.

Example 3

Chlorine is passed into soft paraffin wax having a melting point of about 40° C. until an increase in weight of about 15 per cent is attained, while maintaining a temperature of between about 50° and 60° C. 100 parts of the resulting chlorinated paraffin are chemically condensed at a temperature of between 30° and 60° C. with 10 parts of naphthalene in the presence of 7 parts of aluminium chloride, 5 parts of zinc oxide and 40 parts of a saturated middle oil having a boiling point range of between 200° and 300° C. which latter product acts as diluent.

The reaction product is treated with dilute hydrochloric acid and is then subjected to a steam distillation in vacuo. A residue consisting of a good hot steam cylinder oil having a flash point of 310° C. and a viscosity of 12° Engler at 100° C. is obtained in a yield of about 50 per cent. The distillate is freed from paraffin wax by freezing out and furnishes a further 20 per cent of a light lubricating oil having a viscosity of 3° Engler at 50° C. 25 per cent of unchanged paraffin wax are recovered from the distillate. Both the aforesaid cylinder oil and the light lubricating oil from the distillate may be employed for the production of motor oils by mixing them with the usual commercial machine oils.

Example 4

100 parts of soft paraffin wax chlorinated substantially as described in Example 3 and containing 16 per cent of chlorine are chemically condensed with 10 parts of naphthalene at a temperature of between about 130° and 150° C. in the presence of 6 parts of molybdic anhydride. The reaction product is washed with water and is then subjected to steam distillation in vacuo up to a temperature of about 250° C. A distillation residue consisting of a good motor oil having a viscosity of 2.8° Engler at 100° C. is obtained in a yield of about 60 per cent. The distillate also contains a light lubricating oil in a yield of about 15 per cent besides about 35 per cent of the original paraffin wax. Tungstic acid may be employed as the chemical condensing agent in place of molybdic anhydride in the above example.

Example 5

100 parts of chlorinated paraffin wax containing about 14 per cent of chlorine are subjected at a temperature of about 10° C. to centrifuging or filtration or pressing. In this manner 70 parts of a liquid chlorinated paraffin wax are obtained containing about 20 per cent of chlorine and 30 parts of a solid paraffin wax only containing small amounts of chlorine which wax can be subjected again to the chlorinating process.

100 parts of the said liquid chlorinated paraffin are chemically condensed at a temperature of from 100° to 150° C. with 10 parts of tetrahydronaphthalene in the presence of 10 parts of zinc oxide. The reaction yields 60 parts of a hot steam cylinder oil having a flash point of 310° C., 25 parts of a light spindle oil, whereas most of the chlorine is recovered in the form of hydrogen chloride.

Example 6

100 parts of chlorinated soft paraffin containing about 15 per cent of chlorine are treated at a temperature of about 130° C. with 7 parts of zinc chloride. The reaction yields 45 parts of a motor oil having a viscosity of 11° Engler at 50° C., 5 parts of a spindle oil and 35 parts of unchanged paraffin wax.

Example 7

25 parts of a synthetic cylinder oil obtained as described in Example 1 and having a viscosity of about 7° Engler at 100° C. are mixed with 75 parts of a lubricating oil having a viscosity of 1.7° Engler at 100° C. which have been obtained by the destructive hydrogenation of mineral oil containing large amounts of asphalt. A very good motor oil is obtained having the quality of Pennsylvanian oils.

Example 8

100 parts of a chlorinated paraffin wax obtained as described in Example 1 and containing 15 per cent of chlorine are subjected to a distillation in vacuo up to a temperature of about 350° C. Hydrogen chloride is thus split off from the product. The paraffin wax which has thus been dehydrogenated and which contains 15 parts of hydrogen to each 100 parts of carbon is chemically condensed by treatment with 7 parts of anhydrous aluminium chloride and 7 parts of zinc oxide, no heat being introduced. After the removal of unchanged paraffin wax, a condensation product remains in a yield of about 80 per cent which consists of motor oil and which can be separated by careful distillation into two constituents, 40 per cent of spindle oil and 60 per cent of hot steam cylinder oil being thus obtained.

Example 9

A fraction of Columbia oil boiling above 300° C. which for improving its viscosity curve had been subjected to a destructive hydrogenation constitutes a machine oil having a viscosity of 5° Engler at 50° C. and a setting point of 0° C. If this oil is mixed with 10 per cent of a synthetically obtained cylinder oil prepared as described in Example 1 having a viscosity of 6° Engler and a setting point of 0° C., the resulting mixture will have a setting point of 25° below zero C. and a viscosity of 6.5° Engler at 50° C.

Example 10

Chlorine is led at from 60° to 70° C. into a solid paraffin wax obtained by extraction from brown coal until the increase in weight amounts to from about 25 to 30 per cent of the weight of paraffin wax employed. Hydrogen chloride is split off from this chlorinated product by distillation in vacuo up to 360° C. 100 parts of this resulting unsaturated product practically free from chlorine are chemically condensed at from 40° to 60° C. with 7 per cent of aluminium chloride which is added gradually. About 30 per cent of a cylinder oil having a mean molecular weight of about 1500 are obtained and also 70 per cent of a solid, high molecular infusible, insoluble substance consisting of carbon and hydrogen which is separated by extraction with benzine from the lubricating oil formed at the same time, freed from aluminium chloride by boiling with alcoholic hydrochloric acid and finally washed with caustic soda and water.

Example 11

Chlorine is led at from 100° to 150° C. into an illuminating oil (specific gravity 0.780) containing 17 parts of hydrogen to each 100 parts of carbon, while stirring, until the increase in weight amounts to about 18 per cent of the weight of the illuminating oil employed. The chlorinated oil is then led at about 350° C. over barium chloride, hydrochloric acid being thus split off.

100 parts of this dehydrogenated oil practically free from halogen are polymerized with 8 parts of aluminium chloride without the supply of heat. The temperature rises to from 80° to 100° C. owing to the heat of reaction. After removing the aluminium chloride 40 per cent of an illuminating oil are obtained and also 60 per cent of a lubricating oil having a viscosity of 17° Engler at 50° C. and the temperature-viscosity curve of a Pennsylvanian lubricating oil.

The resulting lubricating oil may be split up into one third of a spindle oil and two thirds of a cylinder oil having a viscosity of about 5° Engler at 100° C.

Example 12

Hard paraffin wax having a specific gravity of 0.780 at 60° C. is chlorinated until the product has a specific gravity of 0.940 at 60° C. This product which contains about 25 per cent of chlorine, is then subjected to steam distillation in vacuo at temperatures up to 360° C., whereby the chlorine is split off in the form of hydrogen chloride. The resulting dehydrogenated product is subjected to a sweating operation for removing unaltered paraffin, and thereafter has a specific gravity of 0.840 at 20° C.

100 parts of this product are diluted with 100 parts of a saturated benzine obtained by refining in the usual manner, and 7 parts of zinc oxide and 7 parts of aluminium chloride are then gradually added. The chemical condensation is carried out at between 30° and 40° C. After the reaction is complete, the condensing agent is removed by filtration, the diluent (benzine) is distilled off, and the resulting oil is heated to 300° C. and filtered again. The resulting product is composed of 15 per cent of illuminating oil (kerosene), 20 per cent of spindle oil boiling between 220° and 300° C. under about 20 millimeters mercury pressure, and 60 per cent of cylinder oil boiling above 300° C. at the said pressure. The cylinder oil is golden yellow and shows green fluorescence; it has a specific gravity of 0.881 at 20° C., a viscosity of 15° Engler at 99° C. and gives a value of 0.66 in the Conradson carbon test.

By "condensation," as employed in the appended claims, we mean a joining together of two or more molecules, as distinguished from a purely physical condensation from the vapor to the liquid stage, and by "condensing agent" in the appended claims we mean an agency capable of effecting the joining of two or more molecules.

This application is a continuation-in-part of our copending application Ser. No. 480,284 filed September 6, 1930 now U. S. Patent 2,130,024.

What we claim is:

1. The process of producing a hydrocarbon oil of viscosity index above 115 containing hydrogen and carbon in a ratio of more than 13.5 parts of hydrogen to each 100 parts of carbon, comprising passing chlorine gas into a straight chain paraffin wax at a temperature between room temperature and about 100° C., to produce chlorine derivatives of substantially the same number of carbon atoms, removing unchlorinated wax hydrocarbons from the produced chlorparaffins, completely dechlorinating the chlor-paraffins and simultaneously polymerizing the resulting olefinic hydrocarbons by heating the chlorparaffins in the presence of metallic aluminium, and separating the said dechlorinating and polymerizing catalyst from the produced entirely dechlorinated high viscosity index hydrocarbon oil.

2. The process according to claim 1 carried out by cooling the mixture containing unchlorinated wax hydrocarbons and produced chlorparaffins to a temperature below the crystallizing temperature of the unchlorinated wax hydrocarbons and removing the crystallized unchlorinated wax hydrocarbons.

3. Process of producing liquid oils comprising subjecting a straight chain paraffin wax to the action of a halogenating agent under conditions adapted to convert it into halogen derivatives of substantially the same number of carbon atoms, and subjecting the thus treated product to the action of a chemical condensing agent in the presence of a bleaching earth to make high V. I. oils.

4. The process of producing lubricating oils which comprises passing chlorine into paraffin wax at a temperature below about 150° C., to introduce the chlorine at points mainly removed from the ends of the hydrocarbon chain, subjecting the chlorinated wax to a treatment at a temperature below the cracking temperature of the wax whereby halogen chloride is split off without substantially rupturing the carbon chain of the wax derivative and subjecting the resulting product to the action of a metallic condensing agent at a temperature between 100° C. and 200° C., and correlating the amount of chlorine introduced with said temperature to produce mainly saturated lubricating oils liquid at normal temperatures.

5. Improved process for obtaining valuable derivatives of a normally solid mixture of aliphatic hydrocarbons comprising acting upon the said hydrocarbons with a halogen substituting agent under conditions adapted to convert them, without rupturing their carbon structure, into halogen derivatives of substantially the same number of carbon atoms, subjecting said halogen derivatives to the action of a chemical condensing agent, bleaching earth being added to the chemical condensing agent with which the chemical condensation is carried out, and separating the condensing agent from the product obtained.

MATHIAS PIER.
FRIEDRICH CHRISTMANN.